Figure 1:
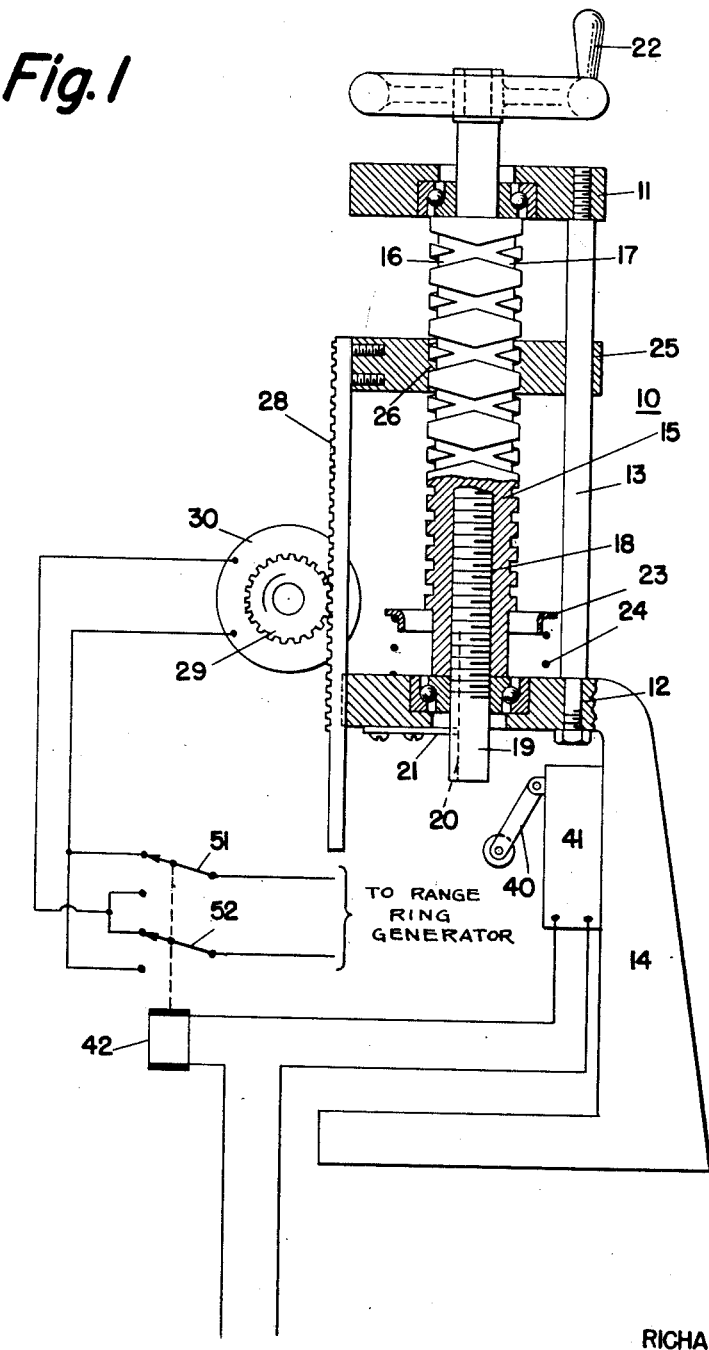

April 9, 1957

R. F. HUELSKAMP ET AL 2,788,424

RADAR RANGING UNIT

Filed May 17, 1956

2 Sheets-Sheet 1

INVENTORS
RICHARD F. HUELSKAMP
FRANK M. KRANTZ
BY
ATTORNEYS

April 9, 1957

R. F. HUELSKAMP ET AL 2,788,424

RADAR RANGING UNIT

Filed May 17, 1956

2 Sheets-Sheet 2

INVENTOR.
RICHARD F. HUELSKAMP
FRANK M. KRANTZ
BY George Sipkin
Edward W. Hughes
ATTORNEYS

2,788,424

RADAR RANGING UNIT

Richard F. Huelskamp, Baltimore, and Frank M. Krantz, Ellicott City, Md., assignors, by mesne assignments, to the United States of America as represented by the Secretary of the Navy Application May 17, 1956, Serial No. 585,587

5 Claims. (Cl. 201—55)

This invention relates to a range system for radar sets and in particular is concerned with improvements in apparatus for varying the sensitivity of the ranging unit.

In a radar system, various mechanical equipment is necessary in determining target ranging data and various electrical equipment is necessary for transmission of the data to remote stations.

The mechanical equipment includes control knobs or hand wheels for operating through shaft and gearing arrangements a ranging counter which is calibrated to indicate yards for short ranges and a miles counter which is calibrated for long ranges. Separate potentiometers are used in such systems and are arranged to be selectively operative by the control knob to transmit by different range sensitivities the short range or yards information and the long range or miles information.

In one such system, for example, a range ring control knob or hand wheel is rotated until the yards counter operates from zero to 100,000 yards. At 100,000 yards, further rotation is prevented until the handwheel is manually raised and the mechanical operation is shifted to the miles counter. During the rotation between 000,000 and 100,000 yards, a circuit would be established including one potentiometer of the desired sensitivity range for transmitting the range data. During the rotation above 100,000 yards, the miles counter is made operative for ranges up to approximately 300 miles and another circuit is established including a potentiometer having a different sensitivity range for transmitting the range data. The change in sensitivities or operation by different potentiometers having been effected by the manual raising or upward movement of the handwheel which movement actuated a limit switch to energize relays, switches, etc. for this purpose.

In such systems, which are typified by that generally described above, it has been necessary to use two different potentiometers or banks of potentiometers and the manual raising of the handwheel is necessary to switch the range sensitivity and change of operation from one potentiometer to another which has resulted in numerous operating difficulties.

By the present invention a rotatable control cam is provided which is rotated in only one direction for operating on both range sensitivities and for operating on both the yards and miles counter. The control cam is so designed that a single potentiometer can be used for the low and high sensitivities and the circuitry switched, when changing from one sensitivity to another, by reversing the terminals of the potentiometer. The design of the rotatable element is such that the arm of the potentiometer is rotated both clockwise and counterclockwise during rotation of the control knob in only one direction. The voltage of the potentiometer progressively increases during the cycle of rotation in one direction and progressively decreases during rotation of the cam in the opposite direction by switching from one sensitivity to another as the potentiometer arm changes its direction of movement.

Figure 2:
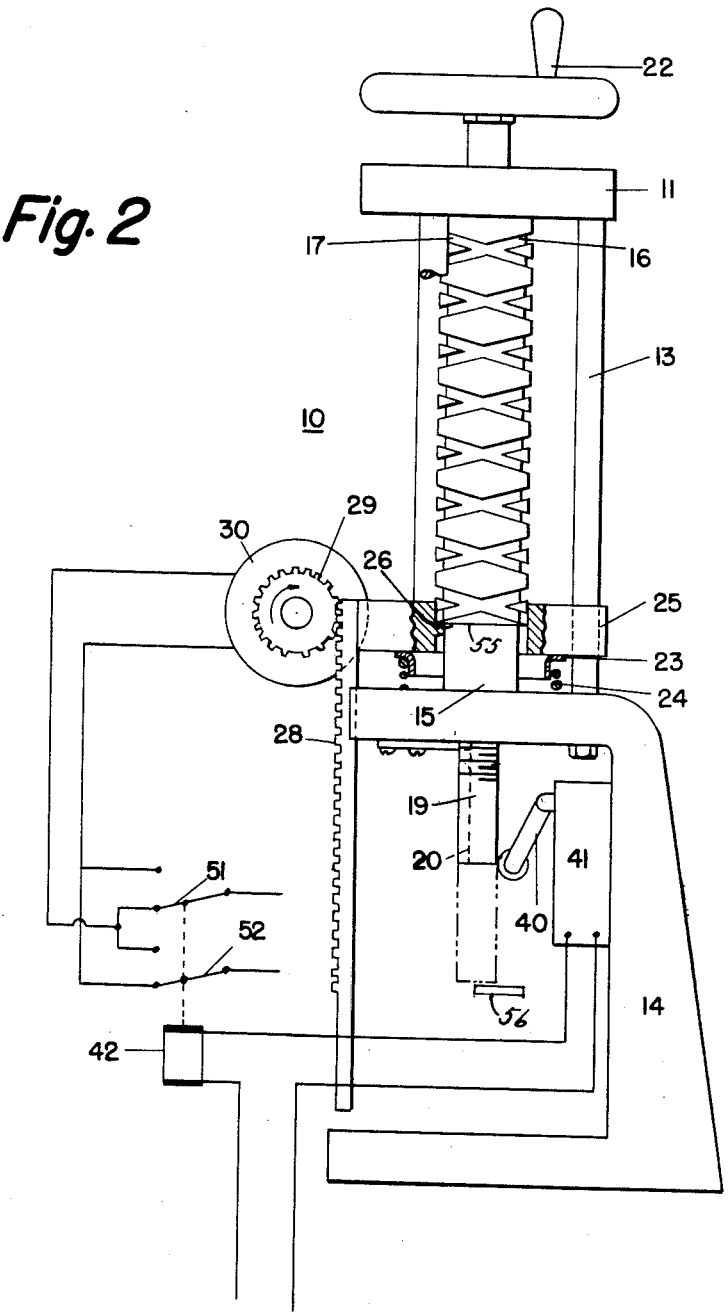

Other objects and advantages of the invention will hereinafter become more fully apparent from the following description of the annexed drawings, which illustrate a preferred embodiment, and wherein:

Fig. 1 is a partial sectional view of the control device in one position of operation with cooperating elements shown diagrammatically; and Fig. 2 is a view in elevation of the control device in a different operating position with a portion sectioned to show details and with cooperating elements shown diagrammatically.

Referring to the drawings, a frame is indicated generally at 10 and comprises spaced upper and lower plates 11 and 12 which are bolted together by a plurality of rods as indicated at 13. A support 14 is provided for the assembly and may be formed integral with the plate 12 as shown.

The control cam 15 is mounted for rotation within the frame by means of upper and lower bearing raceways provided in the plates 11 and 12. The control cam 15 is provided on its outer surface with reversely arranged helical grooves 16 and 17 providing a continuous double helix or reverse thread. The cam is hollow and its cylindrical inner surface is provided with a single internal threaded area 18 in which is received a cooperating threaded shaft or follower 19 having a keyway 20 at its lower end and a cooperating key 21 is fixed to the plate 12. A rotatable crank 22 is fixed to the upper end of the cam 15; and during rotation of the crank, the key 21 coacts with the keyway 20 and prevents rotation of the shaft 19 but provides for its movement longitudinally of the cam. A flanged ring 23 is mounted at the lower end of the cam and is biased upwardly by a spring 24 which is compressed against the plate 12 and provides a thrust bearing arrangement for the control cam 15.

A transverse arm 25 having a lug 26 forming a follower, coacts with the grooves 16 and 17 of the cam and upon rotation of the cam provides reciprocative movement of the transverse arm 25. A rack having a toothed area 28 is carried by the transverse arm 25 and extends lengthwise of the cam 15 and its toothed area 28 coacts with a pinion 29 for operating a potentiometer shown diagrammatically at 30. Detailed structure of the potentiometer 30 is not shown as it is not considered necessary for an understanding of the invention.

At 40 is indicated a switch actuating arm, the movement of which operates switch means in switch box 41 for energizing solenoid 42 to change the position of switches 51 and 52 from one set of contacts to the other set for reversing the circuitry of the potentiometer 30.

In Fig. 2, the follower 26 is at the end of its movement downward through groove 16 and at 55 is indicated a dwell zone or area wherein the follower 16 remains stationary before it reverses its direction of travel upwardly through groove 17. The dwell zone or area 55 extends over substantially a 90° arc of the cam and permits or provides sufficient time for the switching of the potentiometer circuitry to occur before the follower reverses its direction of travel.

In operation when the crank 22 is rotated, the cam 15 will rotate between the fixed bearings and the shaft or follower 19 will be held stationary through the keyway 20 and key 21 interlock. As the cam 15 continues to rotate, the shaft 19 will move downwardly from its position shown in Fig. 1 to the position shown in Fig. 2 which represents one half cycle of the operation of the crank arm 22 in the clockwise direction. At this time the lower end of the shaft 19 will contact the arm 40 which will actuate switch mechanism in the switch box 41 for energizing solenoid 42 and effect the movement of switches 51 and 52 from one set of contacts to the other set.

At this time the potentiometer 30 has moved to the lower end of the rack and before it moves back to its starting position, the follower 26 will be disposed under the dwell zone 55 of the control cam 15 and will remain stationary until it is picked up by the reversing groove 17 and carried upwardly upon further rotation of the cam.

At the beginning of the cycle of rotation in the clockwise direction by crank 22, the potentiometer 30 would be operating in the lower sensitivity range and the sensitivity would be increased progressively until the follower 26 reaches the dwell zone 55 of the cam 15. When the lower end of the arm 19 actuated the switch actuating arm 40, the circuitry of the potentiometer is switched; and as the potentiometer moves upwardly on further clockwise rotation of the crank arm, it would operate in the higher sensitivity range.

After the shaft 19 has reached its lower limit of movement as indicated by the mechanical stop 56, the crank 22 is rotated in the counterclockwise direction and the operation carried out in the decreasing range direction.

From the description it will be understood that the relationship between the reverse grooves 16–17 and the threaded area 18 provides for complete movement of the follower 26 in both the forward and return directions, while the follower 19 completes its movement in only one direction, and that the switch actuating arm 40 is operative when the follower 26 is stationary in or on the dwell zone 55.

Obviously many modifications and variations of the present invention are possible in the light of the above teachings. It is therefore to be understood that within the scope of the appended claims the invention may be practiced otherwise than as specifically described.

What is claimed is:

1. In a radar ranging system, a control cam mounted for rotative movement in either direction and having a cylindrical inner and a cylindrical outer surface, a continuous double reversed helix on the outer surface of the cam, a first follower for the reversed helix, a threaded area on the inner surface, a second follower for the threaded area, said reversed helix being adapted for longitudinal reciprocation of the first follower through a complete forward and return movement while said second follower is adapted for longitudinal movement only in one direction during rotative movement of the cam in one direction, a dwell zone in the outer cylindrical surface whereby the first follower is maintained stationary, a switch actuable by the second follower while the first follower is in said dwell zone, a potentiometer, means operable by the first follower for progressively varying the resistance of the potentiometer and means operable by said switch means for changing the sensitivity of the potentiometer.

2. In a radar ranging system, a control cam mounted for rotative movement in either direction and having a cylindrical inner and a cylindrical outer surface, a continuous double reversed helix on the outer surface of the cam, a first follower for the reversed helix, a threaded area on the inner surface, a second follower for the threaded area, said reversed helix being adapted for longitudinal reciprocation of the first follower through a complete forward and return movement while said second follower is adapted for longitudinal movement only in one direction during rotative movement of the cam in one direction, a dwell zone in the outer cylindrical surface whereby the first follower is maintained stationary, a switch actuable by the second follower while the first follower is in said dwell zone, a potentiometer, means operable by the first follower for progressively varying the resistance of the potentiometer, means operable by said switch means for changing the sensitivity range of the potentiometer and stop means to limit movement of the second follower in said one direction prior to rotation of the cam in its opposite rotative movement.

3. In a radar ranging system, a control cam mounted for rotative movement in either direction and having a cylindrical inner and a cylindrical outer surface, a continuous double reversed helix on the outer surface of the cam, a first follower for the reversed helix, a threaded area on the inner surface, a second follower for the threaded area, said reversed helix being adapted for longitudinal reciprocation of the first follower through a complete forward and return movement while said second follower is adapted for longitudinal movement only in one direction during rotative movement of the cam in one direction, a dwell zone in the outer cylindrical surface whereby the first follower is maintained stationary, a switch actuable by the second follower while the first follower is in said dwell zone, a potentiometer, a toothed rack movable with the first follower, a pinion mounting the potentiometer and coacting with the toothed rack for progressively varying the resistance of the potentiometer and means operable by said switch means for changing the sensitivity range of the potentiometer.

4. Reciprocating apparatus for actuating elements of a radar ranging system which comprises a hollow cylinder, a support mounting the cylinder for rotative movement in either direction, a continuous double reversed helix on the outer surface of the cylinder, first follower means received in the reversed helix, a threaded area on the cylinder inner surface, a second follower received by the threaded area, said first follower being longitudinally reciprocable laterally of the cylinder and said second follower being longitudinally reciprocable axially of the cylinder upon rotation of the cylinder and a transverse dwell zone at one end of the reversed helix wherein the first follower is maintained stationary during rotation of the cylinder.

5. Reciprocating apparatus for actuating elements of a radar ranging system which comprises a hollow cylinder, a support mounting the cylinder for rotative movement in either direction, a continuous double helix on the outer surface of the cylinder cam, first follower means received in the reversed helix, a threaded area on the cylinder inner surface, a second follower received by the threaded area, said first follower being longitudinally reciprocable laterally of the cylinder and said second follower being longitudinally reciprocable axially of the cylinder upon rotation of the cylinder, said reversed helix providing for complete reciprocative movement of the first follower while the threaded area provides complete movement of the second follower in one direction, a transverse dwell zone at one end of the reversed helix wherein the first follower is maintained stationary during rotation of the cylinder when the second follower reaches its limit of movement in one direction.

References Cited in the file of this patent

UNITED STATES PATENTS

| 2,247,562 | Santen | July 1, 1941 |
| 2,338,271 | Ulanet | Jan. 4, 1944 |
| 2,473,566 | Brassell | June 21, 1949 |
| 2,502,761 | Stachowiak et al. | Apr. 4, 1950 |
| 2,709,725 | Bieber et al. | May 31, 1955 |